G. E. MILLS.
Ore Washer.
No. 27,463.
Patented March 13, 1860.
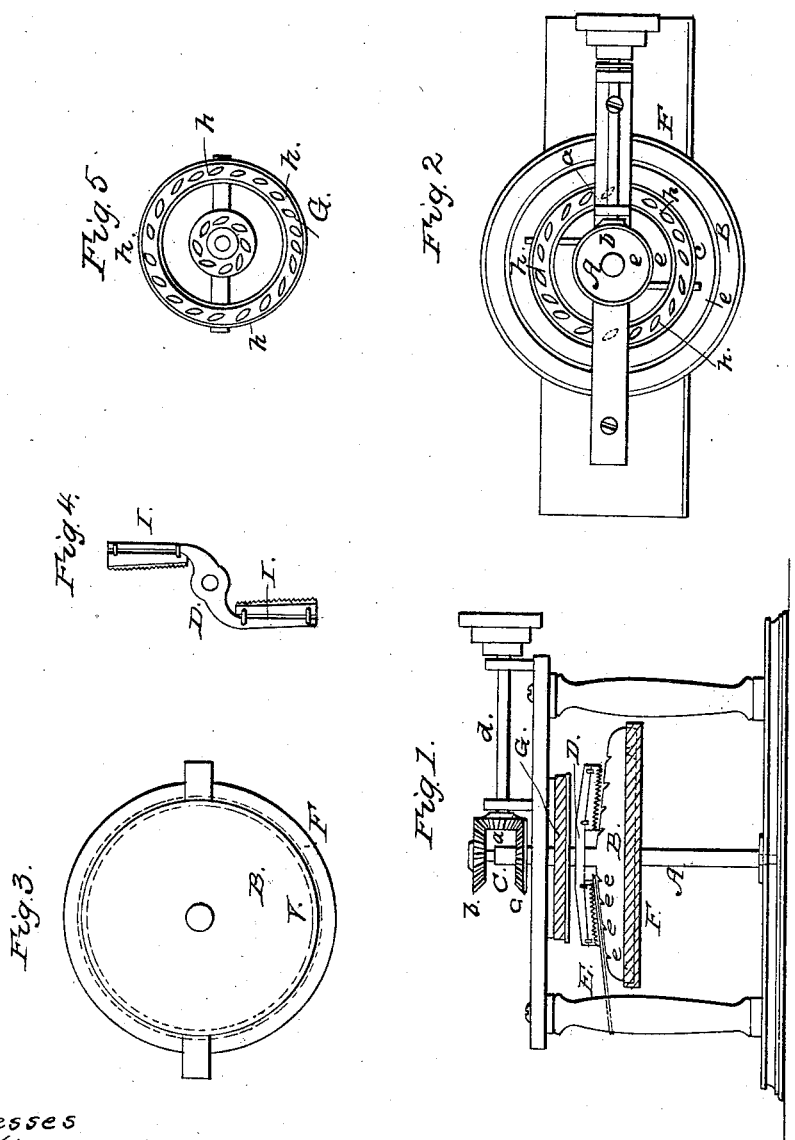
Witnesses
Edw. F. Brown
J. B. Woodruff
Inventor
George E. Mills

UNITED STATES PATENT OFFICE.

GEORGE E. MILLS, OF NEW YORK, N. Y.

ORE-WASHER.

Specification of Letters Patent No. 27,463, dated March 13, 1860.

*To all whom it may concern:*

Be it known that I, GEORGE E. MILLS, of the city and county of New York, in the State of New York, have invented a new and useful Improvement in a Gold and Ore Washer; and the following is a clear and exact description of the same, reference being had to the accompanying drawings, making a part of this specification.

The nature of my invention consists in the construction and arrangement of the channels, in the bottom of which are countersunk slots, or openings, to discharge the water on to the revolving disk, also the diverging rakes, revolving in the opposite direction, and the flat, or half round pipe to flow the ore from the disk, and allow the hinged rakes to pass over freely. Likewise the circular oblique riffles in the disk.

To enable others skilled in the art, to make and use my invention, I will proceed to describe it, referring to the drawings and the letters marked thereon.

Figure 1, represents a side elevation. Fig. 2, shows a top plan. Fig. 3, is the disk turned over. Fig. 4, shows the diverging rakes detached. Fig. 5, shows the channels to receive the ore and water.

In (Fig. 1) the frame is composed of a bed-piece, two pillars, and a beam to support and form the bearings of the vertical shaft (A,) on which the disk (B,) revolves. On the upper end of the shaft (A,) and above the disk, is a sleeve (C,) on which is fastened the rake arm (D,) made to revolve in the opposite direction to the disk (B,) by two bevel-gear wheels ($b$, and $c$,) driven by the pinion ($a$,) on a horizontal shaft ($d$,) that communicates motion to the machine. The face of the disk, as seen in Fig. 2, has oblique riffles ($e, e, e, e,$) turned into the surface, to catch and prevent the finer particles from flowing off with the tailings. In the flattened or half-round pipe (E,) there is holes in line with the riffles ($e$,) to wash the ore out. On the under side of the disk as seen in Fig. 3, there is a V shaped groove into which the inside ring of the discharging channel (F,) is fitted to prevent the waste of the ore. The rakes (I) shown in Fig. 4, are made of metal or wood, and are hinged to the arm (D,) so that they will pass freely over the flattened pipe (E,) and distribute the ores evenly on the disk to be washed.

The channels as shown in (Fig. 5) are to receive the gold, and ore. The outer one (G,) is to distribute the water with considerable force through the sunk slits or openings ($h, h, h, h,$) to remove the tailings and earthy matter from the disk (B,) before coming to the flow pipe (E). The form and position of the rake arms (D,) are such by their revolving motion they lead a drawing course from the center of the disk, and leave the ore, smoothly, and force off the tailings and worthless substances.

In my improved ore washer, it will readily be seen that the arrangements of the channels to distribute clean water on the ores, and in cold weather, hot water may be used to prevent the freezing on the disk, together with the diverging rakes to even the ores, rotating in the contrary direction from the disk, and the oblique riffles to catch the finer particles, as also the flattened flow pipe, to allow the rakes to pass over while it washes the ore out, is more practical in its operation than any ever before known or used.

Having thus fully described my invention what I claim as new and desire to secure by Letters Patent is—

The channels, the revolving rakes, diverging from the center, the oblique riffles in the disk, and the flattened or half round flow pipe—all in combination as specified, and for the purposes set forth.

GEORGE E. MILLS.

Witnesses:
    EDW. F. BROWN,
    J. B. WOODRUFF.